United States Patent [19]

Matsuoka

[11] 3,801,209

[45] Apr. 2, 1974

[54] RESILIENT BUSHING

[75] Inventor: Chikara Matsuoka, Toyota, Japan

[73] Assignee: Toyota Jidosha Kogyo Kabushiki Kaisha, Toyota-shi, Japan

[22] Filed: Jan. 18, 1973

[21] Appl. No.: 324,808

[52] U.S. Cl............... 403/225, 16/2, 267/63, 308/238
[51] Int. Cl............................................ B65d 7/48
[58] Field of Search............ 16/2, DIG. 6; 267/63; 308/238; 403/225, 226, 227, 228

[56] References Cited
UNITED STATES PATENTS

| | | | |
|---|---|---|---|
| 2,827,303 | 3/1958 | Herbenar | 308/238 |
| 3,010,733 | 11/1961 | Melton et al. | 308/238 X |
| 3,139,311 | 6/1964 | Melton et al. | 308/238 X |
| 3,300,257 | 1/1967 | Selker et al. | 308/238 X |

Primary Examiner—Bobby R. Gay
Assistant Examiner—William E. Lyddane
Attorney, Agent, or Firm—Toren & McGeady

[57] ABSTRACT

A resilient bushing includes an inner rigid sleeve, an outer concentric rigid sleeve having a radially outwardly extending flange at one end thereof, and an elastomeric tubular insert held under radial compression between the inner and outer sleeves. The tubular insert has a radially outwardly extending flange at the end corresponding to the flanged end of the outer sleeve. On the tubular insert between the flange of the outer sleeve and that of the tubular insert there is fitted an annular disc of a synthetic resin.

5 Claims, 4 Drawing Figures

RESILIENT BUSHING

BACKGROUND OF THE INVENTION

The present invention relates to a resilient bushing.

Known bushings of the type herein under consideration are typically composed of a pair of concentric rigid metal sleeves and a elastomeric tubular insert compressed radially compressed between the pair of sleeves. A radially outwardly flange at one end of the outer sleeve is held in contact with a similar flange at the corresponding end of the tubular insert. The inner sleeve is connected to one of the components, for example, an inner shaft secured to the frame of a motor car, and the outer sleeve to the other component such as a suspension arm of the motor car suspension system. The elastomeric tubular insert serves to isolate noise and vibration between the two components. The bushing is subjected to a twisting action as the suspension arm swings up and down due to moving up and down of a steering knuckle or a wheel carried thereon. Further the bushing is subjected to thrust upon braking of the motor car wheel. The flange of the elastomeric tubular insert is held under axial compression by means of a retainer disc so as to receive any thrust having an axial component. Such twist or thrust causes some relative sliding motion between the flange of the outer sleeve and that of the tubular insert. Since the coefficient of friction between a metal and an elastomer is relatively large, the relative motion between the two flanges causes the flange of the elastometric tubular insert to wear. The wear of the flange will reduce the rigidity thereof in the axial direction, thus impairing the stability or steering performance of the motor car. The reduction in the rigidity will cause the tubular insert between the two sleeves to be displaced under axial thrust resulting in further wear of the insert. Moreover, the relative motion between the two flanges, owing to the friction therebetween, leaves a residual angle of torsion in the tubular insert thereby varying the height of the car and thus resulting in impairing the stability of the car. A large interference of the flange of the tubular insert may not effectively reduce the relative sliding motion between the two flanges.

SUMMARY OF THE INVENTION

The principal object of the present invention is to provide a resilient bushing which overcomes the above disadvantages in known prior art devices.

In accordance with the present invention, a resilient bushing includes an inner rigid sleeve, an outer concentric rigid sleeve having a radially outwardly extending flange at one end thereof, and an elastomeric tubular insert held under radial compression between the inner and outer sleeves. The tubular insert has a radially outwardly extending flange which faces the flange of the outer sleeve and which is spaced a short distance from the latter. An annular disc made of a synthetic resin is fitted on the tubular insert between the flange of the outer sleeve and the flange of the tubular insert.

Other features and advantages of the invention will become apparent from the following description taken in connection with the accompanying drawing illustrating a preferred embodiment of the invention.

DESCRIPTION OF THE PREFERRED EMBODIMENT

Figure 1:
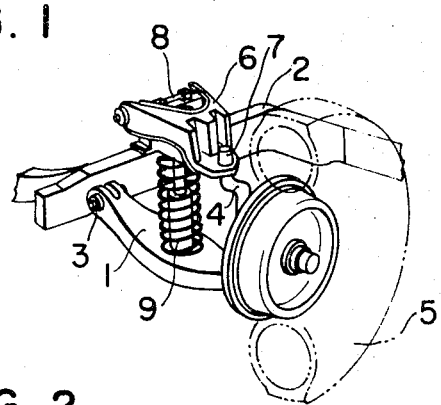
FIG. 1 schematically illustrates the essential parts of a front suspension system of a motor car wherein bushings of the present invention are used.

Referring to FIG. 1, a lower suspension, or control, arm 1 of a front suspension system of a known type is shown attached at one end to the frame 2 of a motor car through a pivot 3. The other end of the lower suspension arm 1 is attached, through a ball joint (not shown), to the lower end of a steering knuckle 4 carrying a front wheel 5. The upper end of the steering knuckle 4 is attached to an upper suspension, or control, arm 6 by a ball joint 7. The inner forked end of the upper suspension arm 6 is attached to the car frame 2 through an inner, or pivot, shaft 8. A coil spring 9 is retained between an upper spring seat on the car frame 2 and a lower spring seat which is a part of the lower suspension arm 1. The upper suspension arm 6 is supported on the inner shaft 8 through resilient bushings 10 of the present invention fitted respectively in the forked ends of the upper suspension arm 6, as shown in FIG. 2, in order to minimize the transmission of noise and vibration between the wheel 5 and the car frame 2.

Figure 3:
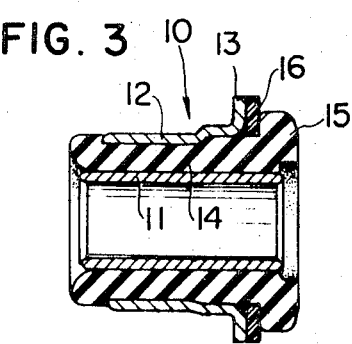
FIG. 3 is a cross-sectional view of the bushing.
Figure 4:
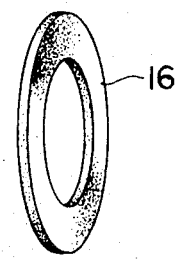
FIG. 4 is a perspective view of an annular disc used with the bushing in FIG. 3.

FIG. 3 illustrates the structure of the bushing 10 including an inner rigid sleeve 11 of metal and an outer rigid sleeve 12 of metal concentrically arranged in spaced-apart relationship to each other. The outer sleeve 12 has a radially outwardly extending flange 13 at one end thereof. Between the inner sleeve 11 and the outer sleeve 12 there is radially compressed a tubular insert 14 made of an elastomer such as natural or synthetic rubber. The insert 14 has a radially outwardly extending flange 15 at one end thereof. The flange 15 of the tubular insert 14 is adapted to face the flange 13 of the outer sleeve 12 with a small axial distance therebetween. Between both flanges 13 and 15 there is fitted an annular disc 16 on the insert 14. The annular disc 16 is made of a thermoplastic or thermosetting synthetic resin such as polyamide-, polyacetal-, phenol-, polyester- or epoxy resin and remains on both sides in contact with both flanges 13 and 15.

Figure 2:
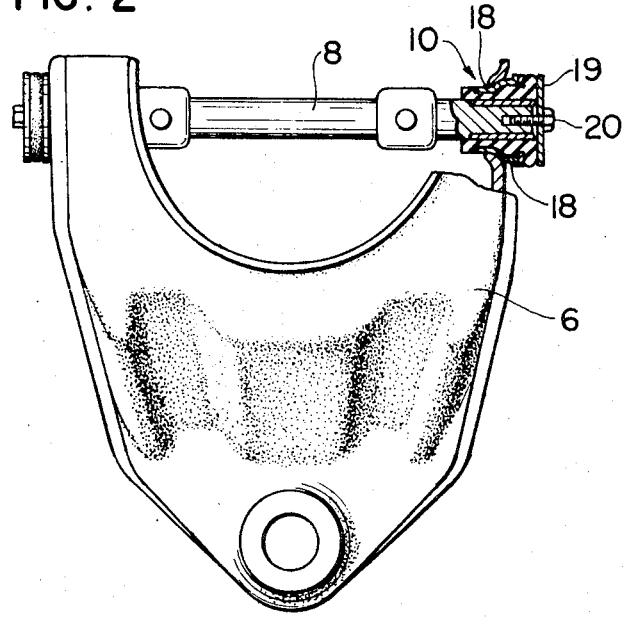
FIG. 2 is an enlarged view, partly in section, of the upper suspension arm in FIG. 1 fitted with the bushings of the invention.

The thus assembled bushing 10 is installed by pushing the inner sleeve 11 onto the end of the inner shaft 8 and pressing the outer sleeve 12 into an opening 18 in the forked end of the upper suspension arm 6, as shown in FIG. 2. The flange 15 of the tubular insert 14 is held under axial compression between the annular disc 16 and a retainer disc 19 fastened against the end of the inner shaft 8 by a retaining screw 20.

When the wheel 5 and the steering knuckle 4 move up and down, the suspension arm 6 swings up and down on the inner shaft 8, thus causing the bushing 10 to twist. In addition, upon application of the brake assembly mounted on the spindle of the steering knuckle 4, the bushing is subjected to axial thrust. Such twist or thrust causes some relative sliding motion between the flanges 13 of the outer sleeve 12, the annular disc 16 and the flange 15 of the tubular insert 14 which are in contact with one another. The coefficient of friction $\mu m$–$r$ between a metal (iron) and a synthetic resin (polyacetal resin) amounts to 0.25, while the friction coefficient $\mu e$–$r$ between an elastomeric material (naturalrubber) and the synthetic resin is 0.34. In other words, the friction coefficient $\mu m$–$r$ between the metal and the synthetic resin is smaller than the friction coefficient $\mu e$–$r$ between the elastometric material and the synthetic resin. Thus, the relative sliding motion between the flange 13 of the other sleeve 12 and the annular disc 16 occurs easier than that between the flange 15 of the elastomeric tubular insert 14 and the annular disc 16. Accordingly, wear of the flange 15 of the tubular insert 14 due to friction may be reduced, resulting in an extension of the life of the insert 14.

An excessive twist or axial thrust would cause relative sliding motion between the flange 15 of the tubular insert 14 and the annular disc 16. However, owing to the sandwiched arrangement of the parts 13, 16, 15, such a twist or thrust is distributed to the contiguous parts 13, 16 and 16, 15 so that the relative motion between the flange 15 of the tubular insert 14 and the annular disc 16 will be less than in the case where the flange 15 of the tubular insert 14 is in direct contact with the flange 13 of the outer sleeve 12 without interposition of the annular disc 16. Thus the life of the insert 14 may still be extended.

The advantages of the bushing of the present invention as mentioned above are summarized as follows:

1. The flange 15 of the elastomeric tubular insert 14 may be effectively kept from wear due to friction. This results in an extension of the life of the insert.

2. The flange 15 of the insert 14 having a smaller or less interference with the retainer disc 19 has a stable rigidity in the axial direction.

3. The tubular insert 14 may be effectively kept from axial displacement between the sleeves 11 and 12 when the bushing is subjected to thrust as previously described.

4. Owing to a smaller friction coefficient between the annular disc 16 and the flange 13 of the outer sleeve 12, the residual angle of torsion of the bushing 10, and, therefore, variation in the height of the car may be reduced. This results in improved stability of the car.

5. An excessive twist or thrust might be distributed to the contiguous parts 13, 16 and 16, 15, so that the relative sliding motion between the flange 15 and the annular disc 16 may be less, thus minimizing wear of the insert 14.

While the present invention has been described in connection with a preferred embodiment, other modifications and variations can be made without departing from the scope of the invention. For example, the bushing of the present invention may be utilized not only in other types of suspension systems but also in many other applications wherein it is desired to reduce the transmission of noise or vibration between interconnected, relatively movable parts.

What is claimed is:

1. A resilient bushing comprising an inner rigid sleeve member, an outer rigid sleeve member concentrically arranged in spaced-apart relationship to said inner sleeve member, said outer sleeve member having a radially outwardly extending flange at one end thereof, an elastomeric tubular insert member held under radial compression between said inner and outer sleeve members, said tubular insert member having a radially outwardly extending flange, the flange of said tubular insert member being adapted to face the flange of said outer sleeve member with a gap left therebetween, and at least one annular disc member of a synthetic resin fitted on said tubular insert member between the flange of said outer sleeve member and that of said tubular insert member.

2. The bushing as claimed in claim 1, wherein said tubular insert member is made of rubber.

3. The bushing as claimed in claim 1, wherein said annular disc member is made of a thermoplastic resin.

4. The bushing as claimed in claim 1, wherein said annular disc member is made of a thermosetting resin.

5. The bushing as claimed in claim 1, wherein said inner and outer sleeve members are made of a metal.

* * * * *